UNITED STATES PATENT OFFICE.

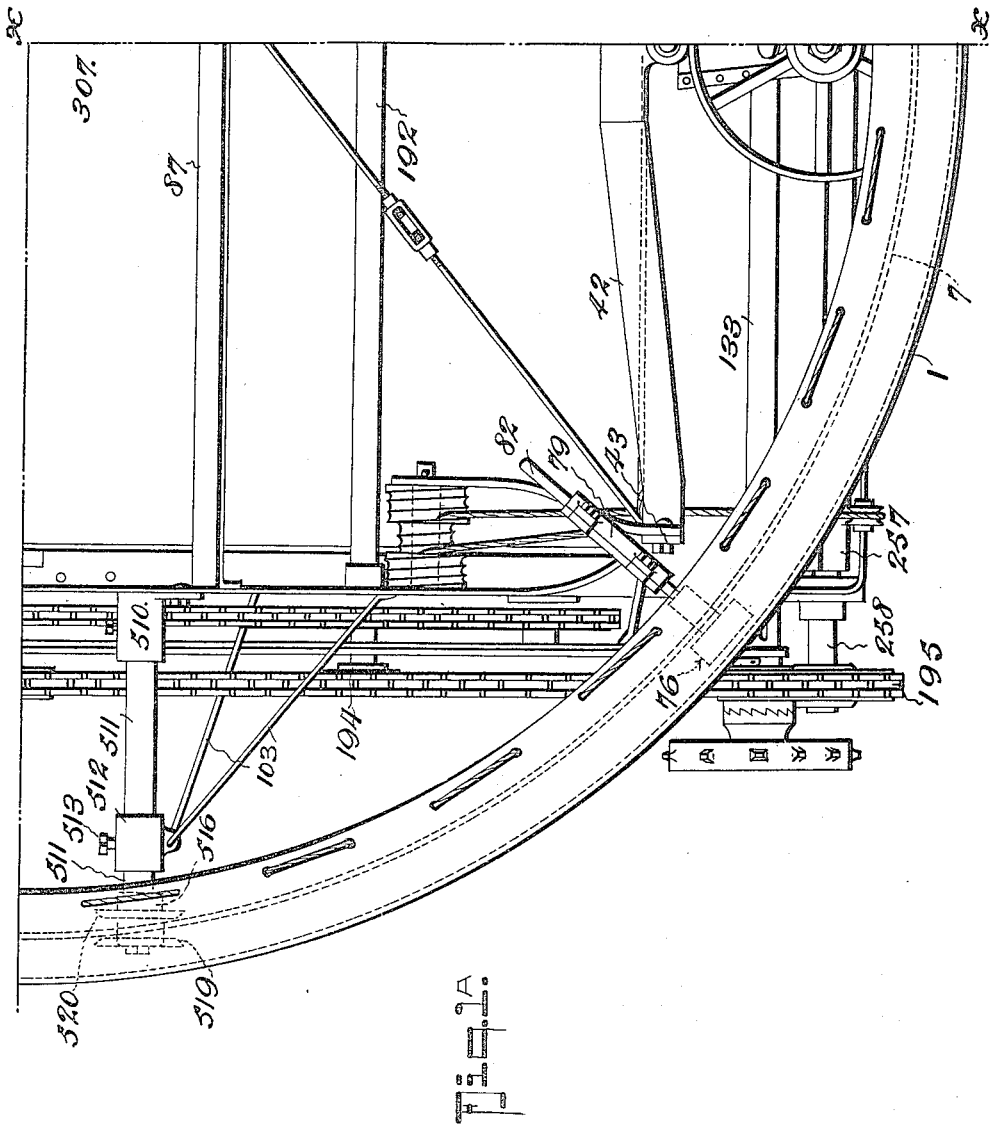

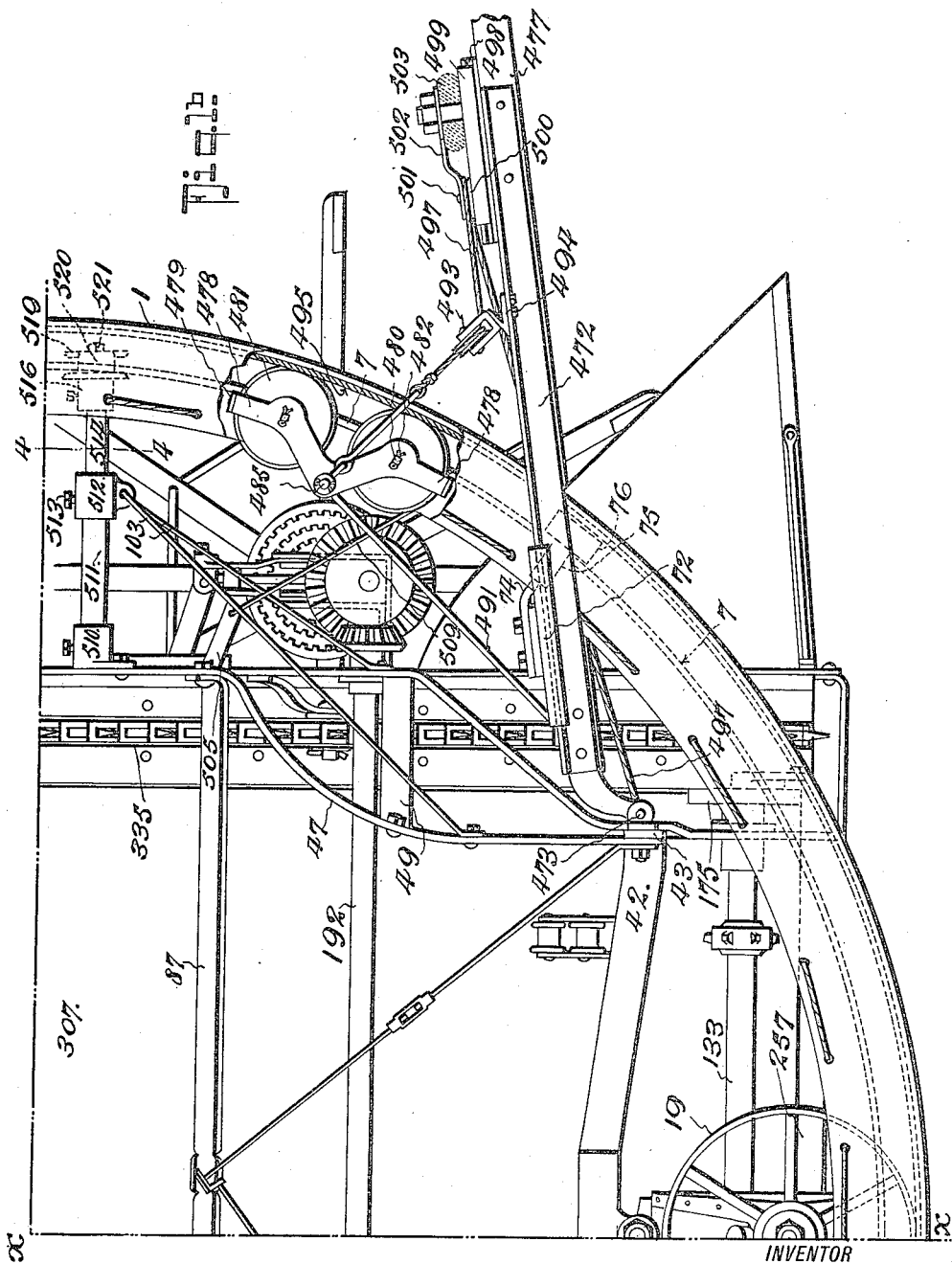

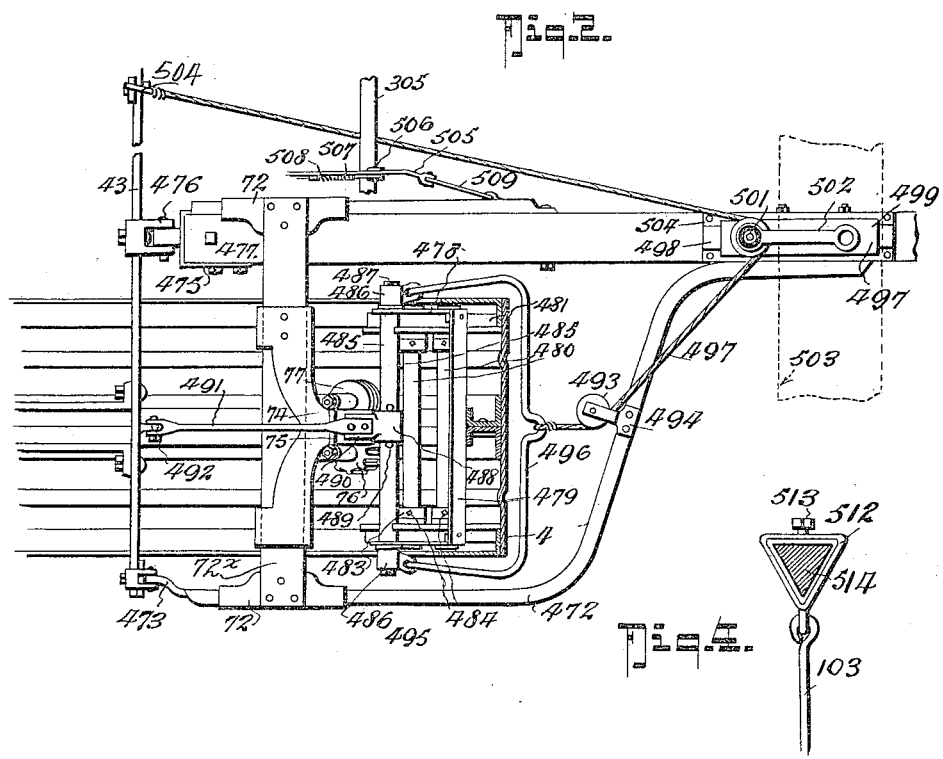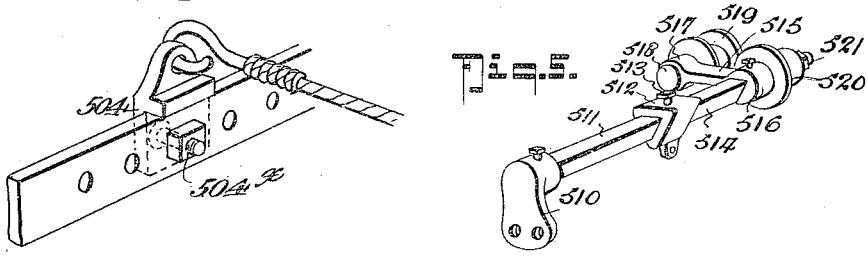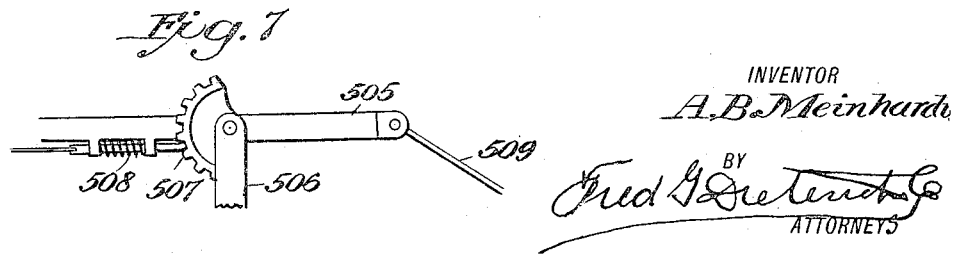

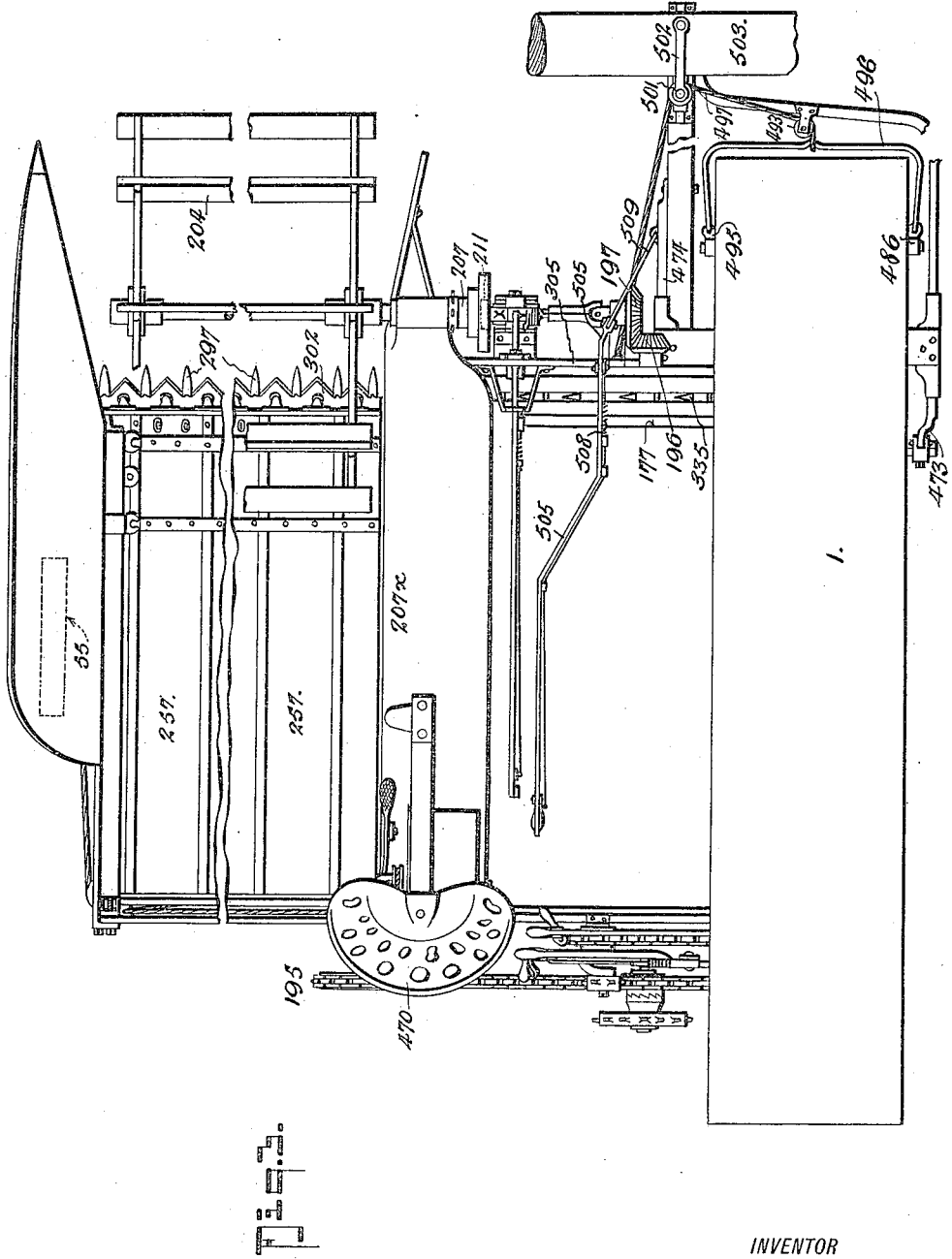

ADAM B. MEINHARDT, OF PAXICO, KANSAS.

HARVESTER.

1,224,004. Specification of Letters Patent. Patented Apr. 24, 1917.

Original application filed December 30, 1915, Serial No. 69,469. Divided and this application filed June 10, 1916. Serial No. 102,860.

*To all whom it may concern:*

Be it known that I, ADAM B. MEINHARDT, residing at Paxico, in the county of Wabaunsee and State of Kansas, have invented certain new and useful Improvements in Harvesters, of which the following is a specification.

My invention is an improved harvester of the spokeless wheel type and it is one of the objects of the present invention to provide a harvester embodying various improvements in construction which form the subject-matter of an original application filed December 30, 1915, Serial No. 69,469, of which this application is a divisional part and the present invention provides a harvester in which the principal weight of the machine is sustained by a wide tread wheel rim so that the machine may be effectively used on soft ground, therefore enabling the saving of much grain during a wet season, a thing quite impossible with the ordinary type of harvester now in common use. More specifically the invention has for its object to provide a horse draft harvester embodying the general improvements described in my aforesaid original application and including special provision whereby the harvester may be drawn over the ground by horses instead of being propelled by mechanical means, as in my original application.

The present invention also includes those novel details of construction, combination and arrangement of parts all of which will be first fully described, then be specifically pointed out in the appended claims and illustrated in the accompanying drawings, in which:

Figure 1 is composed of Figs. 1ᴬ and 1ᴮ joined on the line x—x and is a side elevation of a portion of the machine showing the horse draft appliance.

Fig. 2 is a detail top plan view and part horizontal section of a portion of the mechanism shown in Fig. 1ᴮ.

Fig. 3 is a diagrammatic plan view of the harvester.

Fig. 4 is a cross section on the line 4—4 on Fig. 1ᴮ.

Fig. 5 is a detail perspective view of one of the guiding and bracing mechanisms between the rim and the spokeless wheel.

Fig. 6 is a detail perspective view illustrating the adjustable connection between the cable 497 and the frame bar 43.

Fig. 7 is a detail elevation of a portion of the invention.

In the drawings, in which like numerals and letters of reference indicate like parts in all of the figures, 257 designates the grain platform at the front of which the cutting mechanism 297—302 is located and onto which the cut grain is fed by the reel 204 which is suitably driven by a speed changing transmission gear mechanism 207—211 through beveled gears 197—196 (see Fig. 3) from the operating shaft 192 which is provided with a driving gear 194 that is driven from the main drive chain 195.

The knife bar 302 of the cutting mechanism is operated by a pitman 177 having a crank connection with the disk 175 on the cutting operating shaft 133, the shaft 133 having a gear which is also driven by the chain 195.

207ˣ is the operator's platform on which the seat 470 is mounted and from which seat the controlling devices of the various parts of the machine are arranged to be operated.

307 is the elevator which carries the grain from the platform 257 to the binding mechanism (not shown).

55 is the caster wheel which is located on the platform side of the machine and 19 designates the traction wheels on the other side of the machine which traction wheels run in the runways provided in the spokeless wheel rim 1, and the wheel 1 having a T-flange 7 in its midplane with which the guide rollers 519—520 coöperate.

42 is the main channel bar, 43 the lower platform supports, 47 and 49 the uprights, and 87 the upper longitudinal brace bar, all of which constitute the frame structure of the machine on which the various mechanisms are mounted. The construction of the frame may be of any approved type as in this case I lay no claim to the construction of the frame, *per se*. 335 is a sprocket conveyer combining with the elevator 307 in raising the grain from the platform to the binding devices. 76 designates guide rollers which have slidable collars 75 that are mounted on the bracket 74 at the front of the machine and 76 designates smaller guide rollers at the rear of the machine which are mounted on bars 82 that have slidable movement in brackets 79 secured to the frame of the machine. The bracket 74 is mounted on a cross bar 72× which is suitably secured to the slides 72 in any desired manner.

The yoke bar 472 is hinged at 473 to the frame bar 43 and it has its front end secured to the tongue 477 which lies on the inward or ground side of the spokeless wheel 1 and is fastened to a socket 475 (see Fig. 2) that is hinged at 476 to the frame bar 43, another angle bar 474 being secured to the grain side of the tongue to coöperate with the angle bar 472 in forming a slideway for the members 72 which carry the cross bar (see Fig. 2) on which the brackets 74 are located (see Fig. 2).

A truck whose frame is composed of sides 478 joined by front and back cross bars 479 includes axles 480 for the flanged wheels 481 which run on the tread section 4 of the side flanges 2 of the spokeless wheel 1. The wheels 481 are held against movement on the axle by the sides 478 and by collars 483 that are secured on the axles by set screws 484, the axles being held in place by cotter pins 482.

485 is a mid-cross rod carried by the frame sides 478, on which the swivel sleeves 486 are held by pins 487, the sleeves 486 having ears 495 for the draft yoke 496.

488 is a sleeve on the rod 485 which swivels on the rod and is held from axial movement by pins 489, the sleeve 488 having a projection 490 to which the brace rod 491 is fastened. The rod 491 is also hinged at 492 to the front frame bar 43.

493 is a swivelly mounted sheave over which the draft cable 497 passes, the sheave being mounted at 494 on the yoke angle bar 472 in about the mid-plane of the wheel 1.

The tongue 477 is provided with a T-guide 498 on which the slide 499 is mounted, the slide 499 having a bolt 501 that carries a sheave 500 and passes through one of the eyes of the double tree bar plate 502, the latter projecting over the double tree bar 503 and being fastened by the outer belt thereof, as will be clear by reference to Figs. 1ᴮ and 2.

The cable 497 passes from the yoke 496 through the block of the sheave 493, thence out the sheave 500 and has its end fastened to a part of the main frame of the machine by an adjustable anchor plate 504 secured by a suitable fastening device 504× to the bar 43 and susceptible of being secured at points of different location along said bar whereby to take in or let out on the cable 497, as will be clear by reference to Figs. 2 and 6 of the drawings.

In order that the tongue may be raised and lowered on the pivotal axis 473–476 I provide a lever 505, rack 507 and holding latch 508, the lever being pivoted at 506 to a suitable relatively fixed part of the main structure, as for instance, to the front sideboard 305 of the conveyer, and projecting to a position for convenient operation. The lever 505 is linked at 509 with the tongue and by moving the lever, the tongue may be raised or lowered, as will be clearly understood, by reference to the drawings.

The fastening point for the anchor plate 504 is so located that when the draft pulley is applied to the slide 499 through the double tree there will be no tendency for the machine to be pulled out of the straightway path.

When horse power is used I may, if found desirable, provide an engine of small power to be used simply for the purpose of driving the operating parts of the machine.

Guide members, best shown in Figs. 1ᴮ, 4 and 5, are provided and these members each consist of a bracket 510 securable to the sideboards 305 and carrying a tubular member 511 of angular cross section, the outer end of which member is provided with a collar 512 and set screws 513 to secure the inner angular bar 514 in positions of longitudinal adjustment, the bar 514 telescoping within the tube 511. 515 is a double bearing bracket which is fastened at 516 to the bar 514 and has a bearing 517 for the bolt 518 to which the flanged wheel 519 is securely pinned, the wheel 519 running on the flange 7 of the wheel 1, the flange 7 being also engaged by another flange guide roller 520 which is held on the projecting end of the rod 514 by a suitable set screw 521.

In this application I make no claim, *per se*, to the construction of the grain platform and its allied parts as that forms the subject-matter of a divisional application filed on even date herewith, Serial No. 102856, nor do I make any claim, *per se*, to the construction of the reel and the reel operating mechanism in this application, as that forms the subject matter of another divisional application filed on even date herewith, Serial No. 102857, nor do I make, in this application, any claim, *per se*, to the particular cutting apparatus shown, as that forms the subject matter of yet another divisional application filed on even date herewith, Serial No. 102858, nor do I make any claim to the particular elevator conveyer structure as that too forms the subject matter of another divisional application filed on even date herewith, Serial No. 102859, although I desire it understood that all of the improved mechanism referred to in the aforesaid divisional applications may be embodied in the harvester of the present application, the present application being designed particularly to cover a harvester of the type disclosed in my original application aforesaid, in which provision is made for drawing the same over the ground by means of horses rather than by means of power operated devices.

From the foregoing description taken in connection with the accompanying drawings, it is thought the complete construction, operation and advantages of my invention will be readily understood by those skilled in the art.

What I claim is:—

1. In a harvester, a spokeless traction wheel having a runway, a body frame on which the harvesting machinery is located, a wheeled support for the grain side of said frame, a draft appliance coupled to said frame to extend in front of said spokeless wheel, said draft appliance including a tongue, a yoke secured to said tongue and embracing said spokeless wheel, and a wheeled truck running in said spokeless wheel runway, a brace connecting said truck with said frame, a draft yoke embracing said spokeless wheel and connected to said wheeled truck, a slide shiftably mounted on said tongue and having a sheave, a draft cable passed through said sheave and having one end connected to said draft yoke, and its other end connected to said body frame.

2. In a harvester, a spokeless traction wheel having a runway, a body frame on which the harvesting machinery is located, a supporting wheel for said frame running in said runway, a wheeled support for the grain side of said frame, a draft appliance coupled to said frame to extend in front of said spokeless wheel, said draft appliance including a tongue, a yoke secured to said tongue and embracing said spokeless wheel, means for hinging said yoke to said frame, devices for raising and lowering said tongue and holding said tongue in its different positions, and a wheeled truck running in said spokeless wheel runway, a brace connecting said truck with said frame, a draft yoke embracing said spokeless wheel and connected to said wheeled truck, a slide shiftably mounted on said tongue and having a sheave, a draft cable passed through said sheave and having one end connected to said draft yoke, and its other end connected to said body frame.

3. In a harvester, a spokeless traction wheel having a runway, a body frame on which the harvesting machinery is located, a supporting wheel for said frame running in said runway, a wheeled support for the grain side of said frame, a draft appliance coupled to said frame to extend in front of said wheel and including a yoke hingedly secured to said frame and embracing said traction wheel, a draft tongue secured to said yoke and hingedly secured to said frame, a slidable cross bar on said tongue and yoke, guide wheels supported on said cross bar to operate in said runway of said wheel, a wheeled truck running in said runway, guide rods connecting said truck with said frame, pulleys on said tongue, a cable having one end connected to said truck and passing over said pulleys and having its other end connected to said frame, substantially as shown and described.

4. In a harvester, a spokeless traction wheel having a runway, a body frame on which the harvesting machinery is located, a supporting wheel for said frame running in said runway, a wheeled support for the grain side of said frame, a draft appliance coupled to said frame to extend in front of said wheel and including a yoke hingedly secured to said frame and embracing said traction wheel, a draft tongue secured to said yoke and hingedly secured to said frame, a slidable cross bar on said yoke and draft tongue, guide wheels supported on said cross bar to operate in said runway of said wheel, a wheeled truck running in said runway, guide rods connecting said truck with said frame, pulleys on said tongue, a cable having one end connected to said truck and passing over said pulleys and having its other end connected to said frame, a slideway on said tongue, a slide on said last mentioned slideway, one of said tongue pulleys being located on said last mentioned slide, and a cross tree mounted on said last named slide, substantially as shown and described.

ADAM B. MEINHARDT.

Copies of this patent may be obtained for five cents each, by addressing the "Commissioner of Patents, Washington, D. C."